H. FAULKNER.
PHOTOGRAPHIC APPARATUS.
APPLICATION FILED APR. 16, 1909.
1,013,285.
Patented Jan. 2, 1912.
15 SHEETS—SHEET 5.
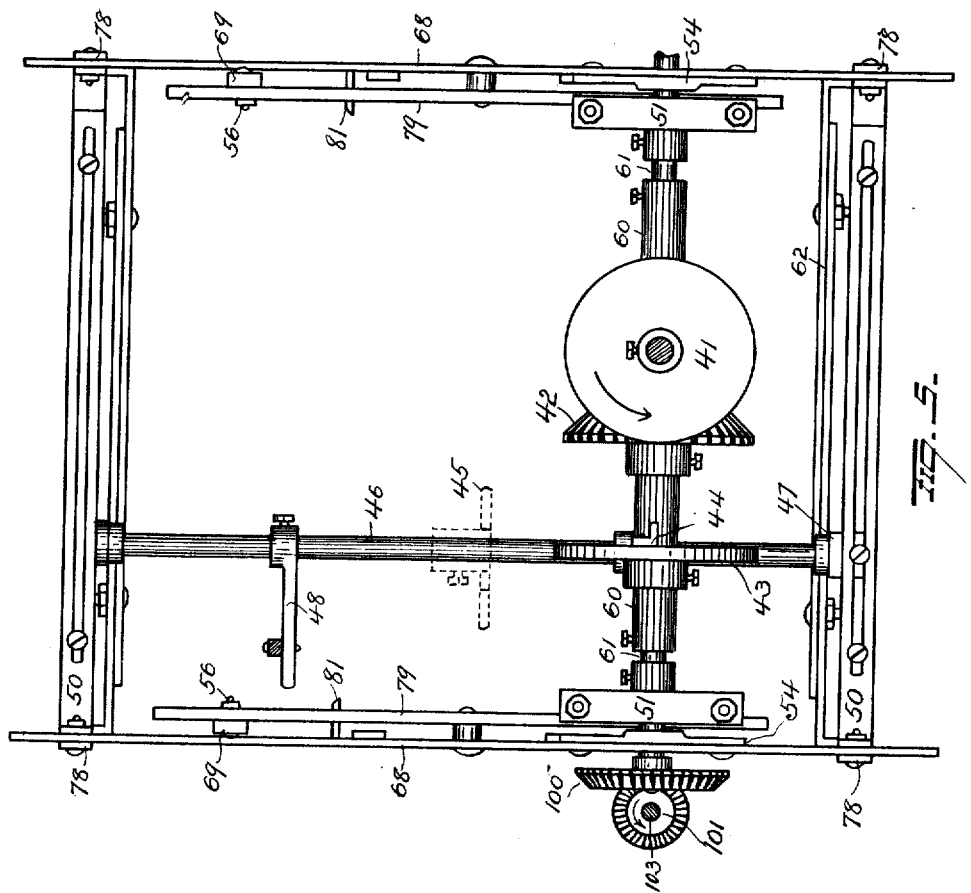

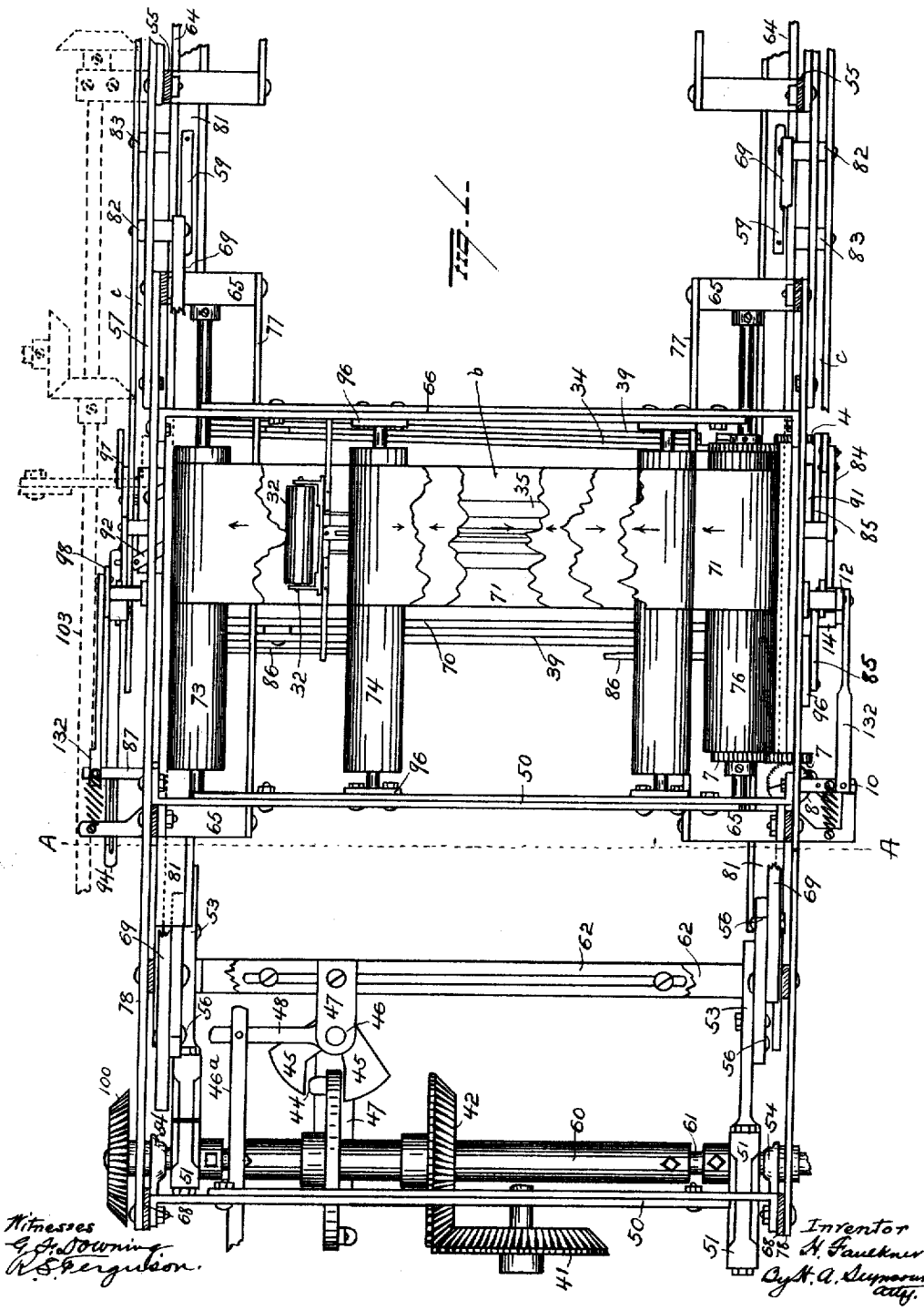

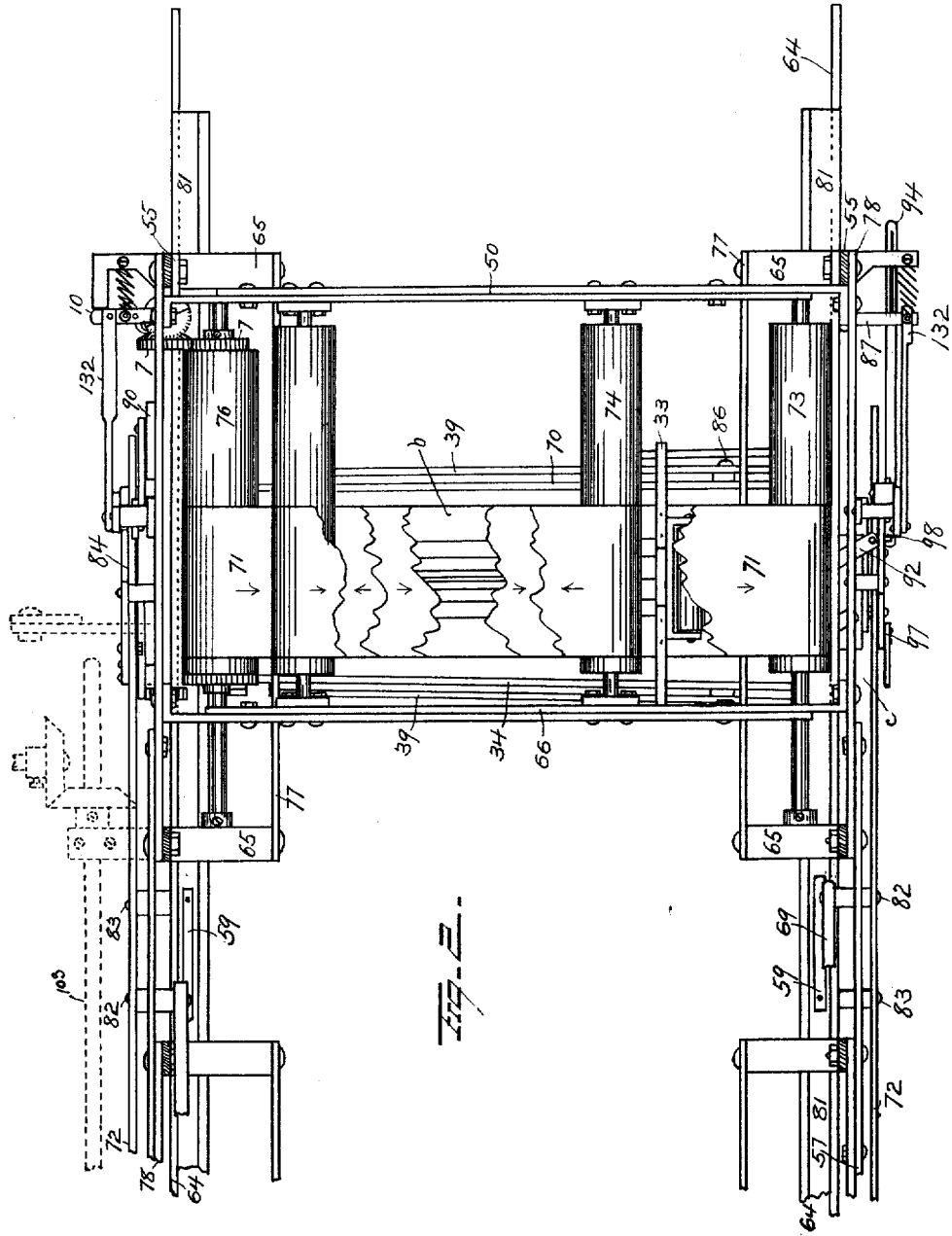

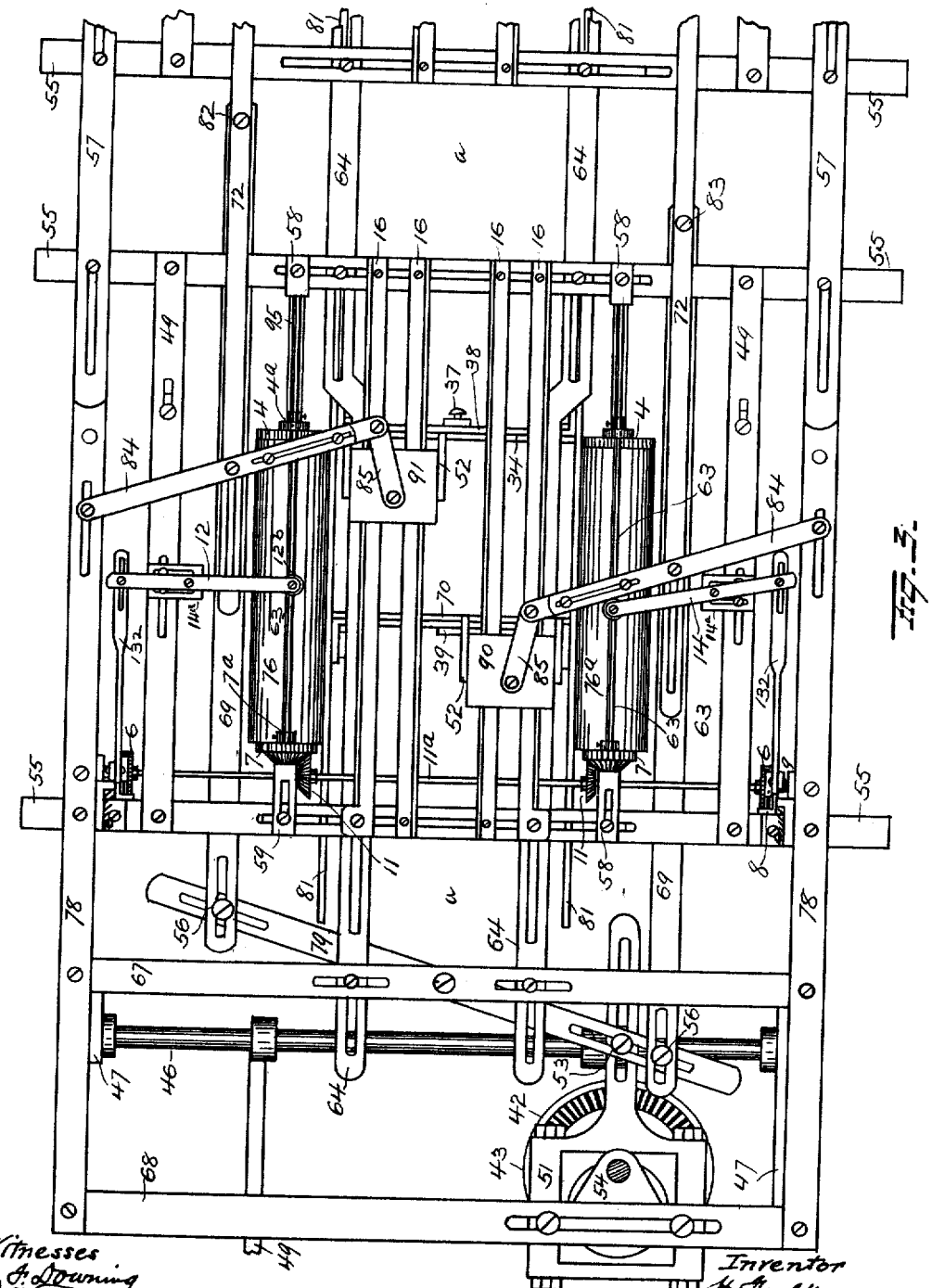

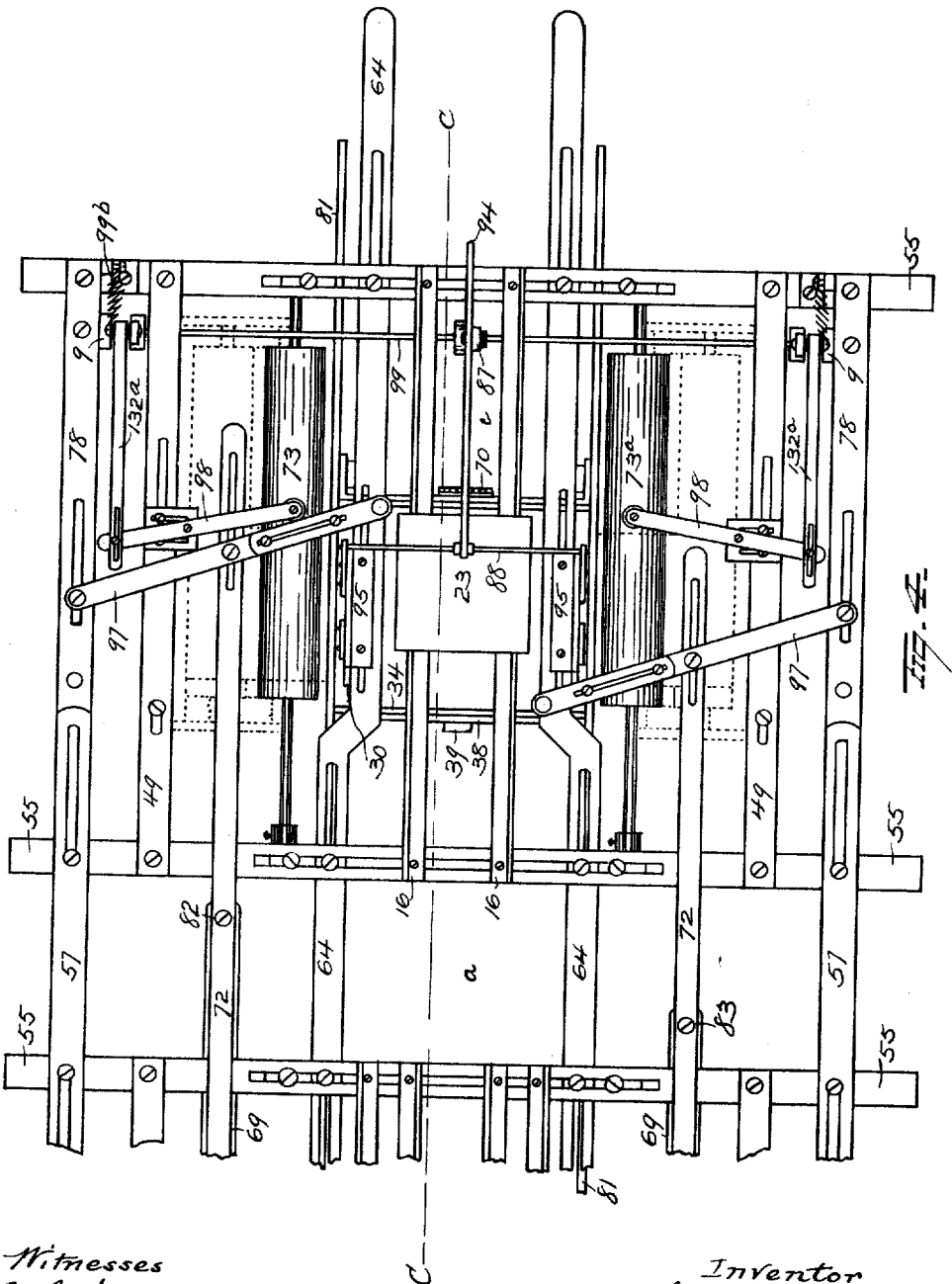

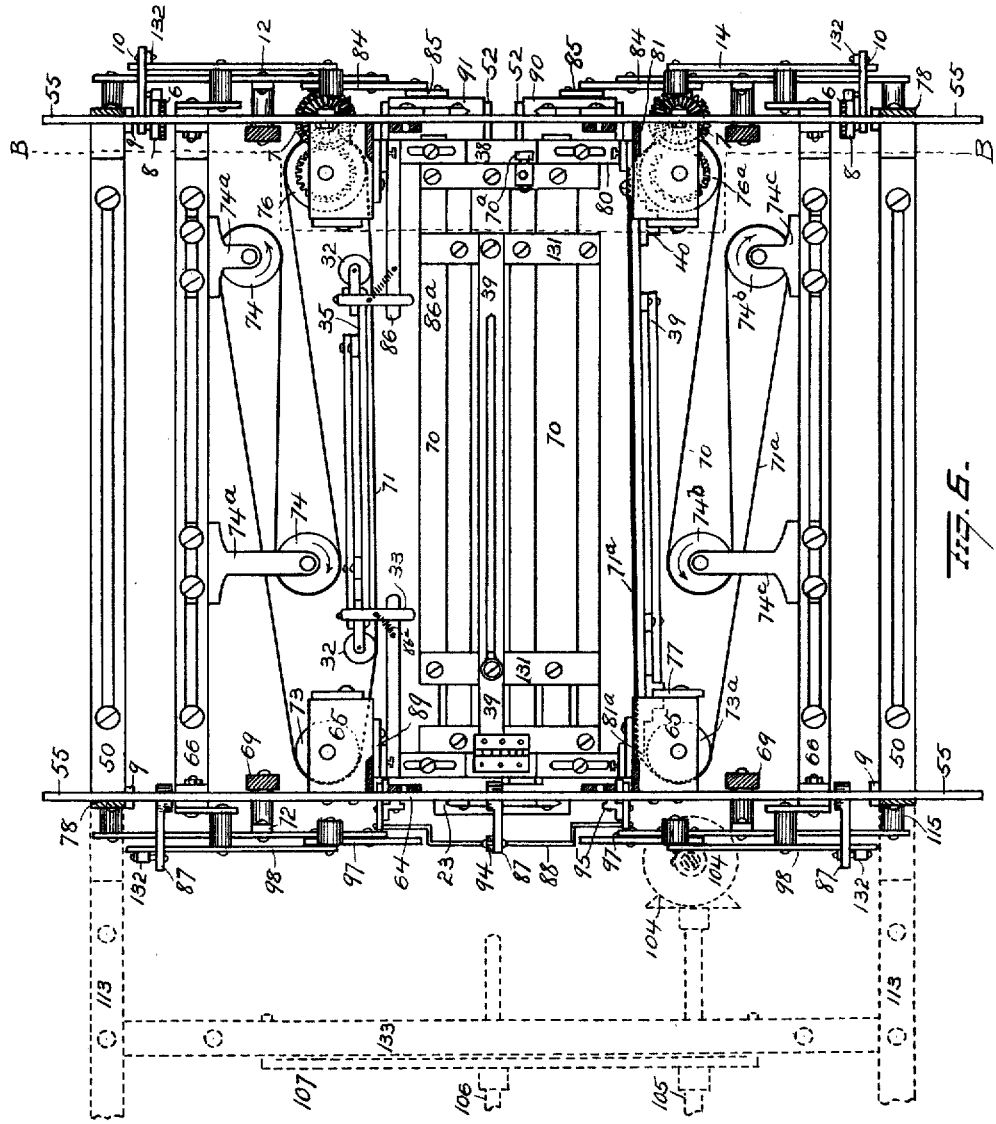

H. FAULKNER.
PHOTOGRAPHIC APPARATUS.
APPLICATION FILED APR. 16, 1909.
1,013,285.
Patented Jan. 2, 1912.
15 SHEETS—SHEET 7.
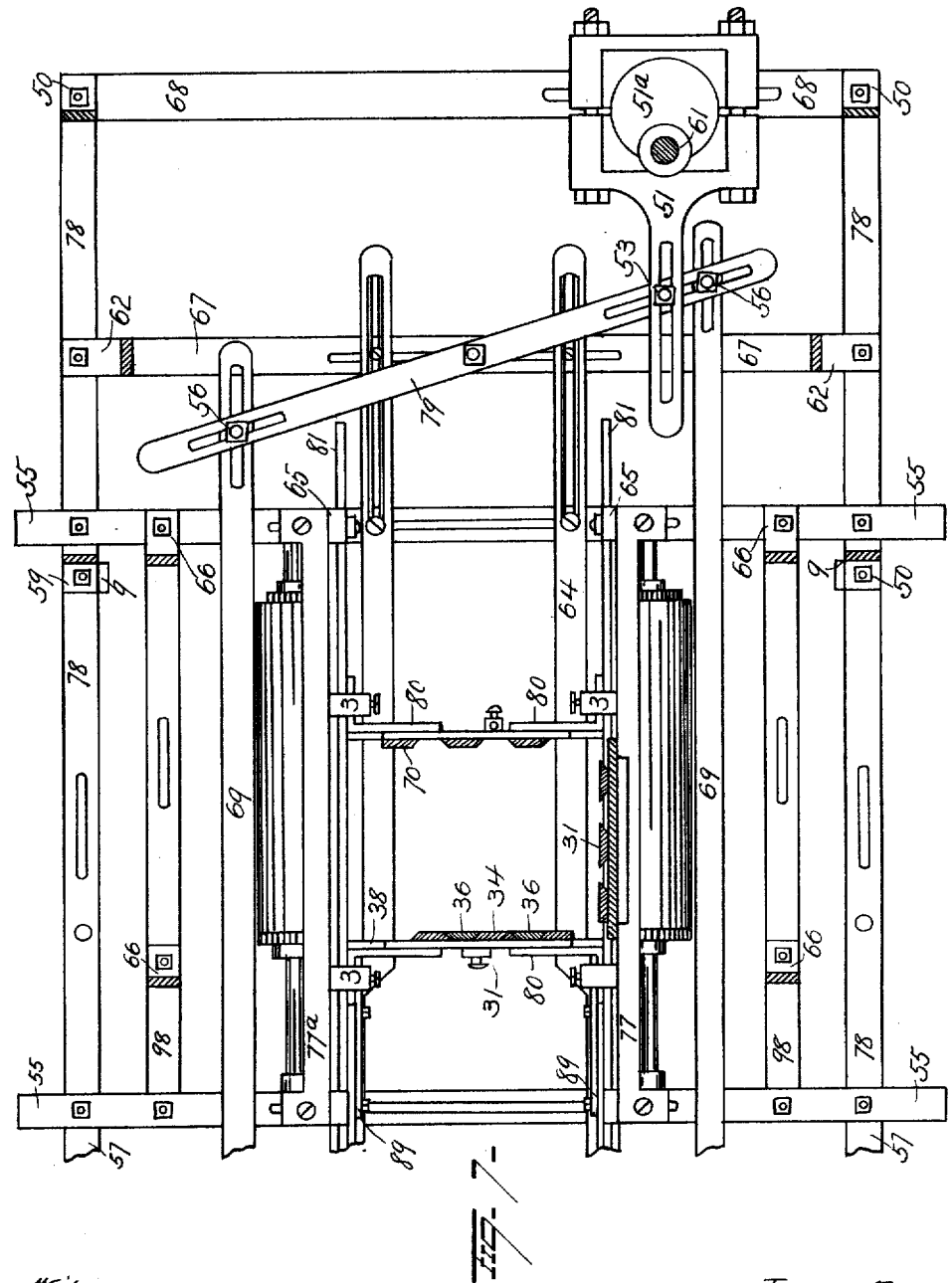

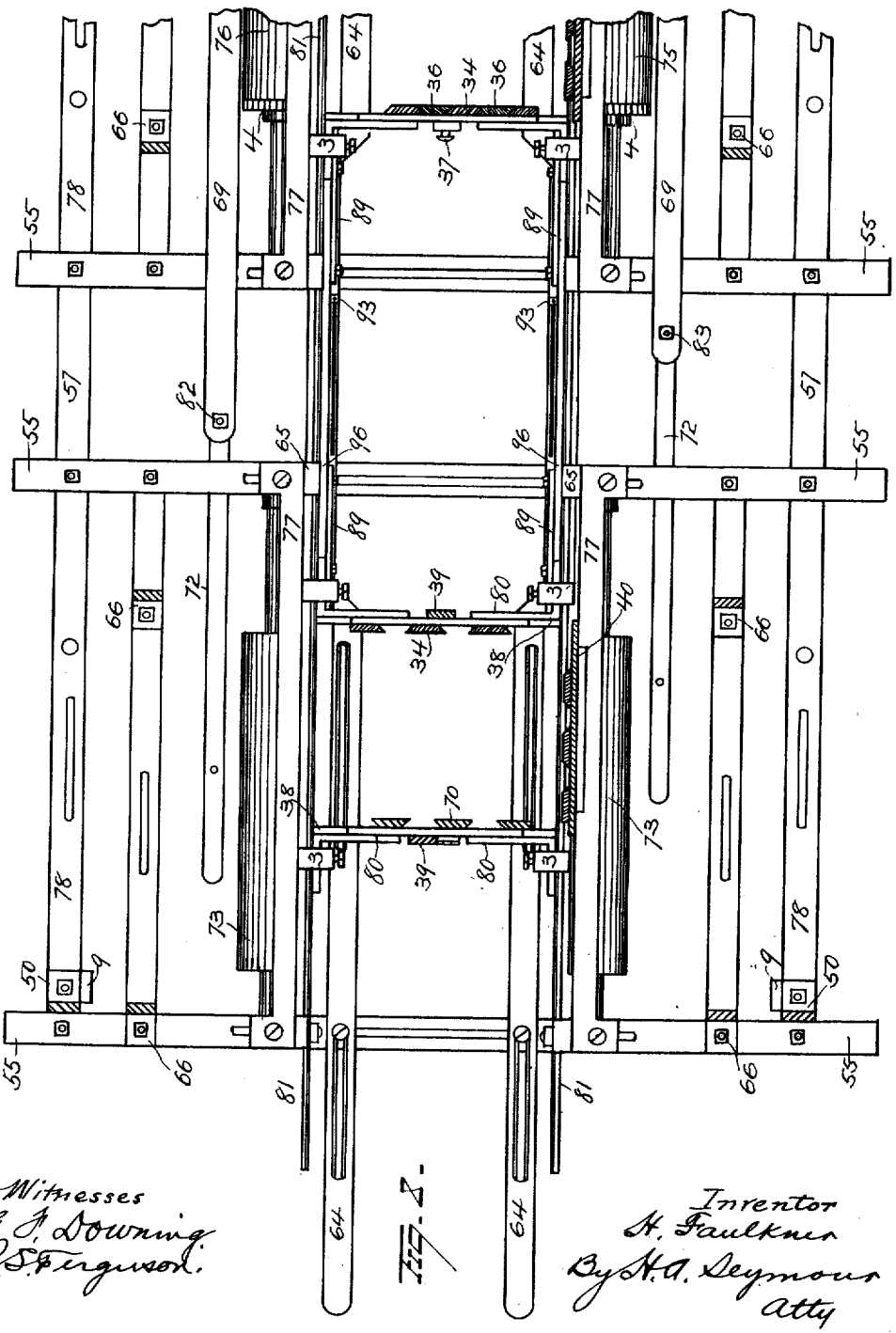

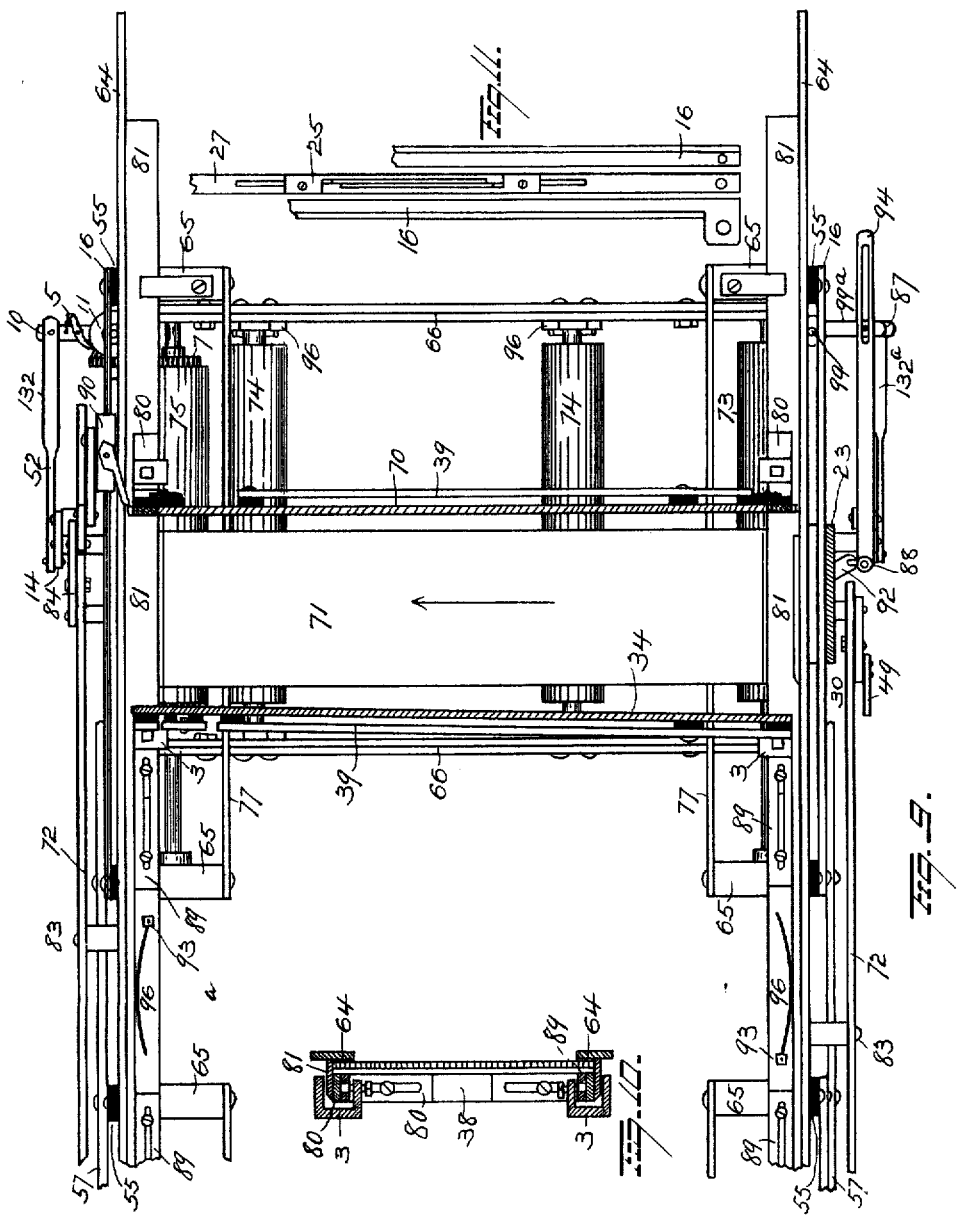

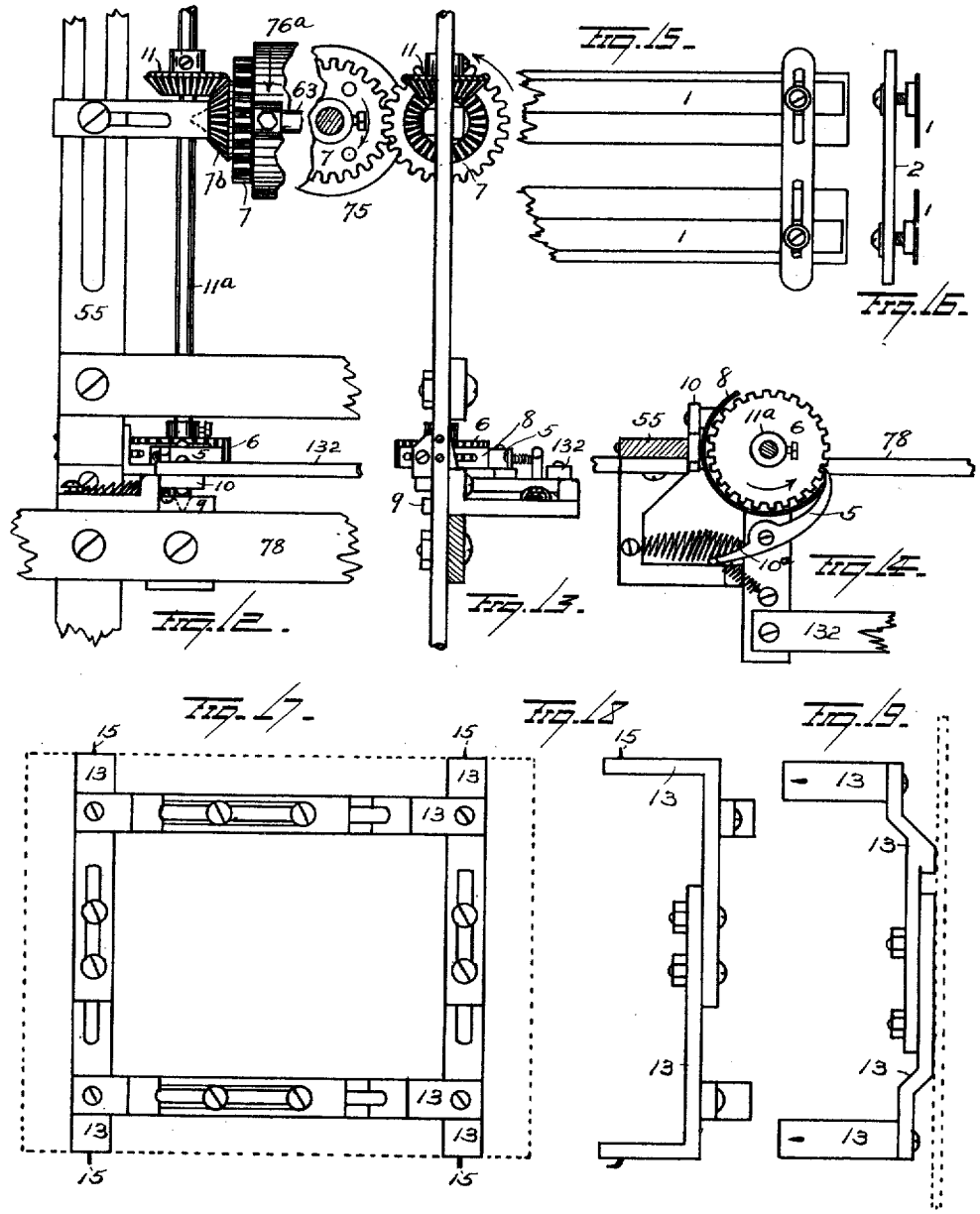

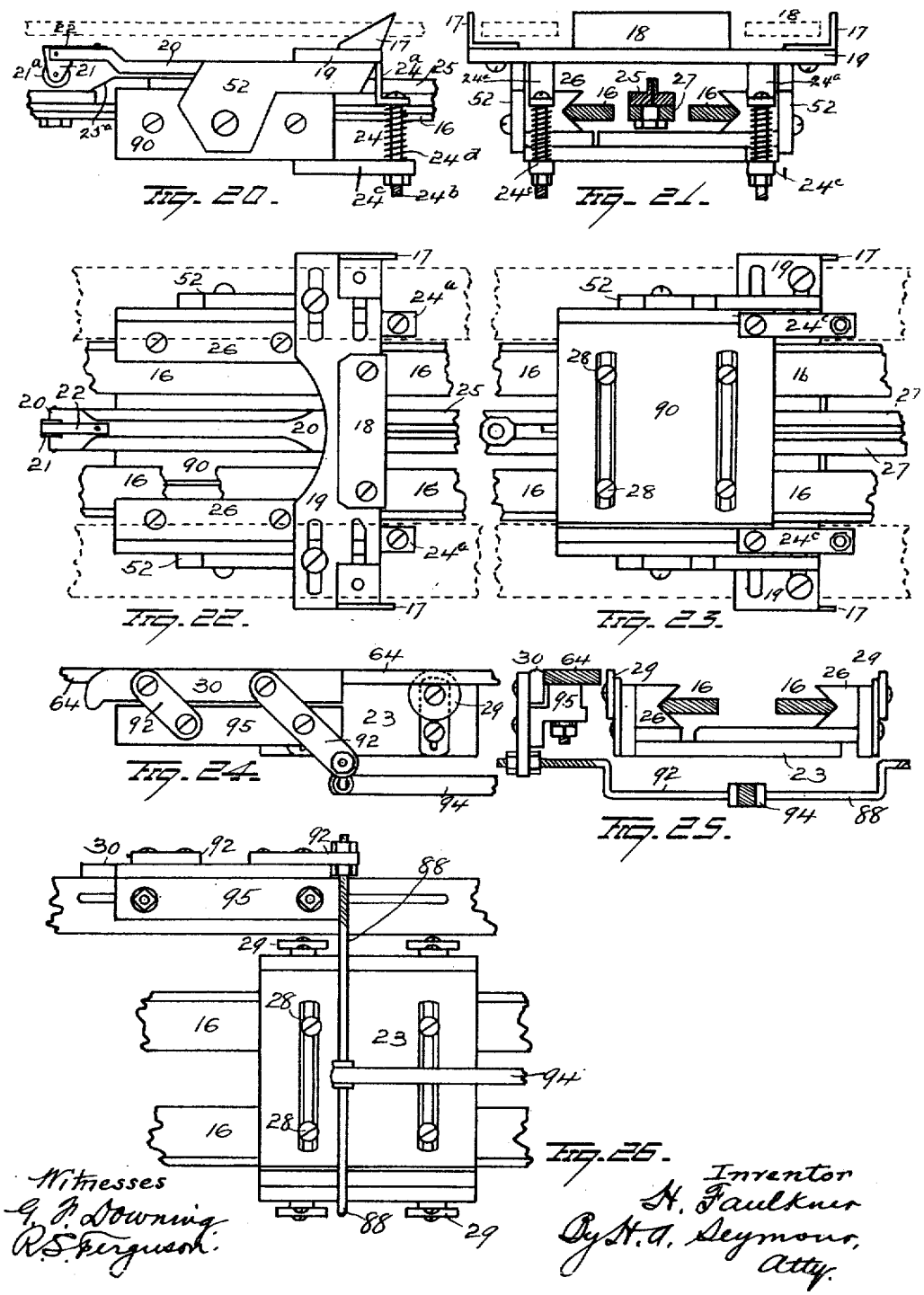

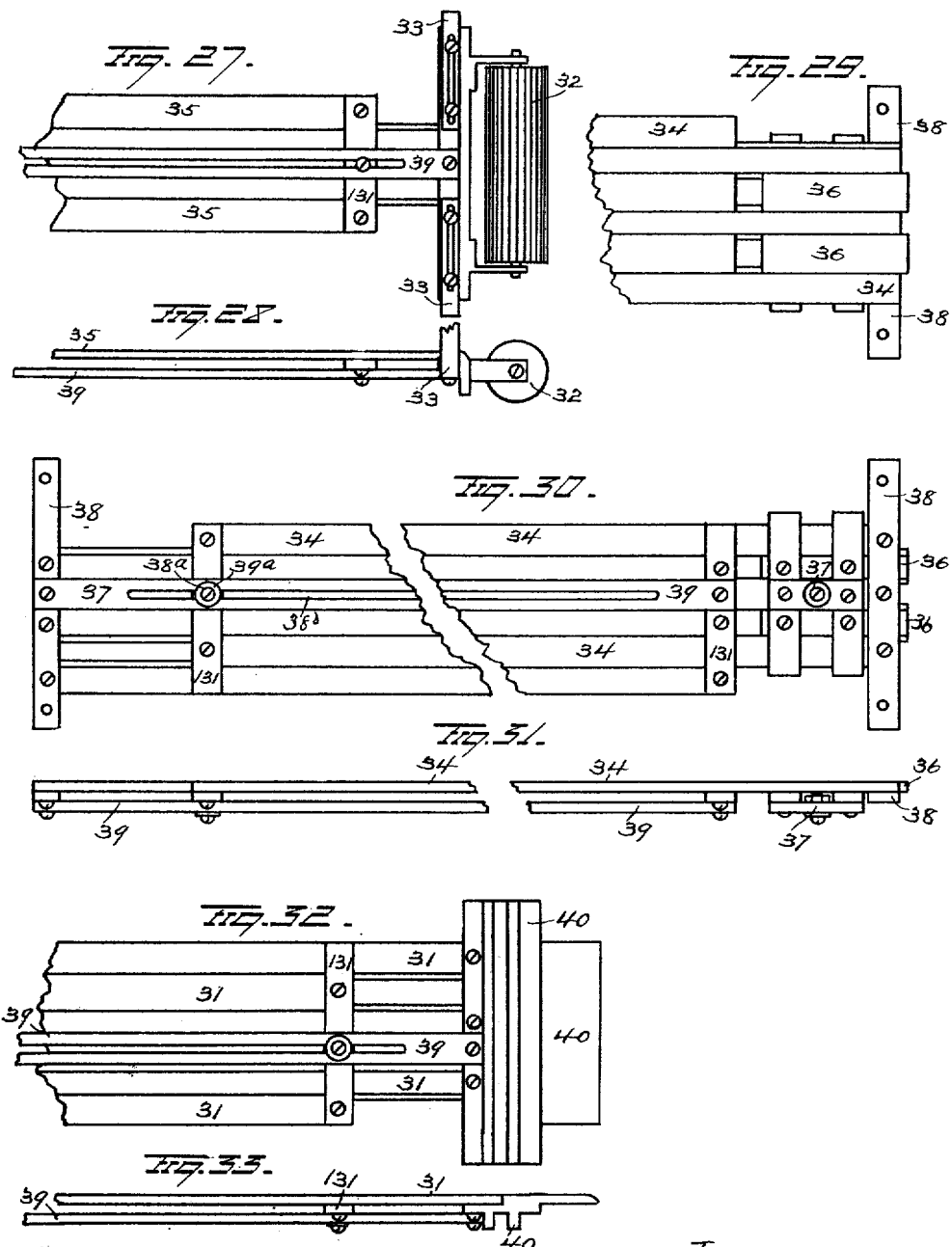

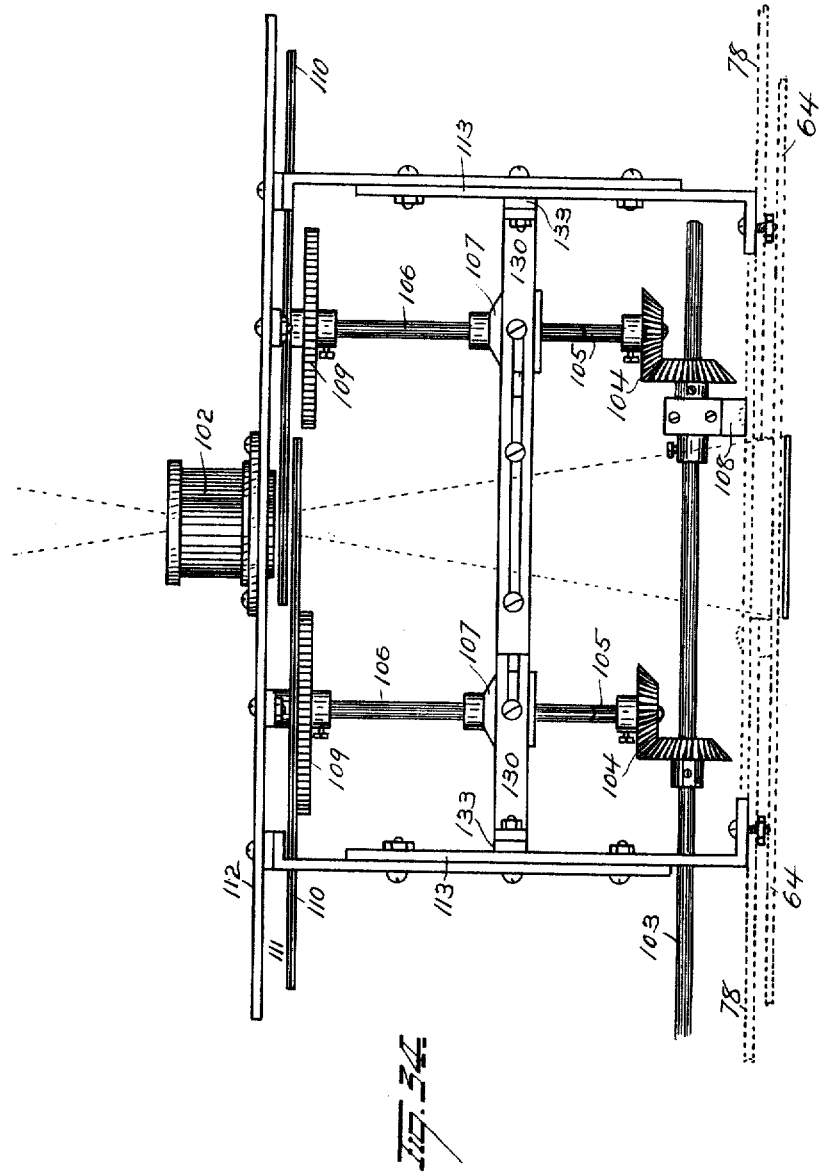

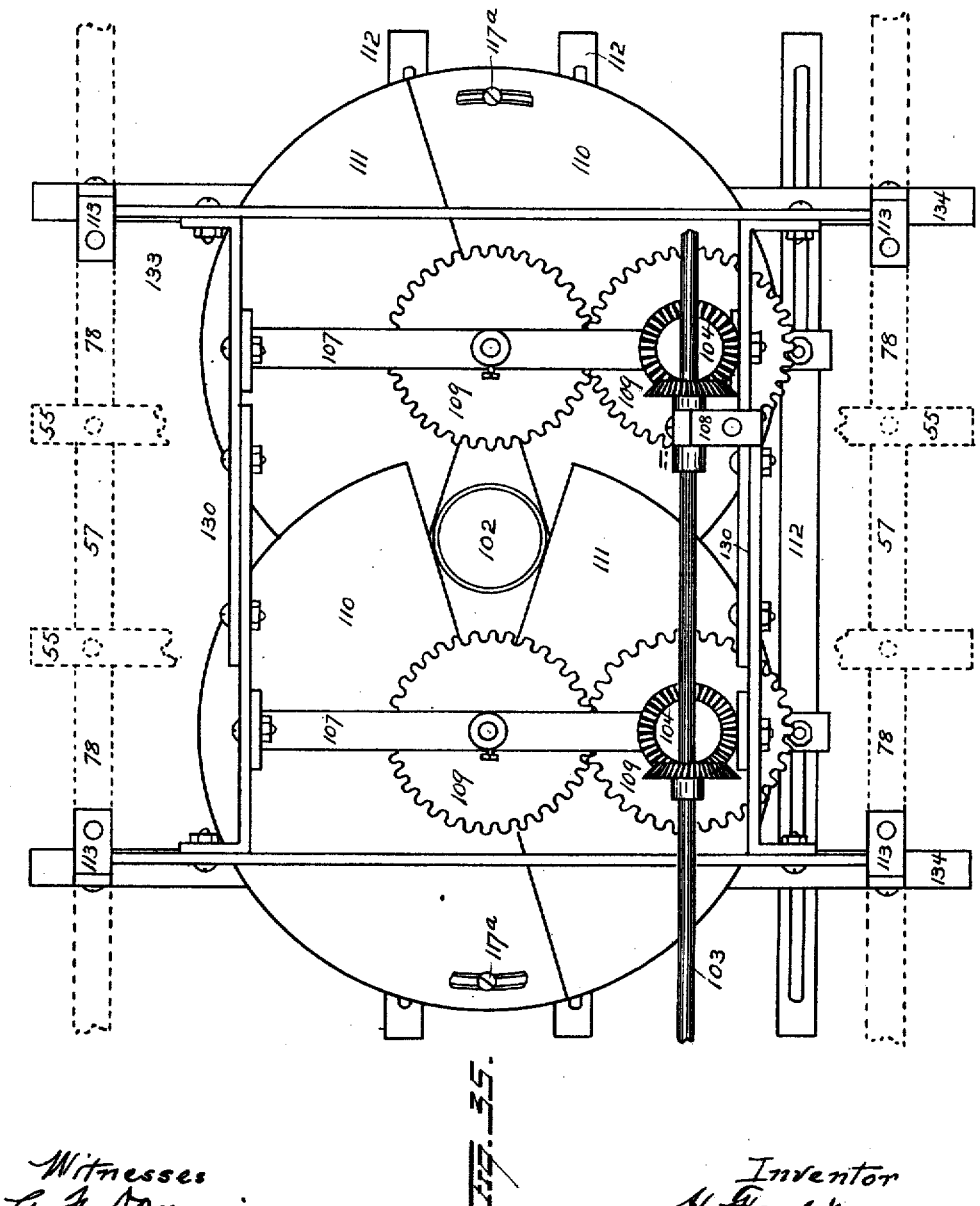

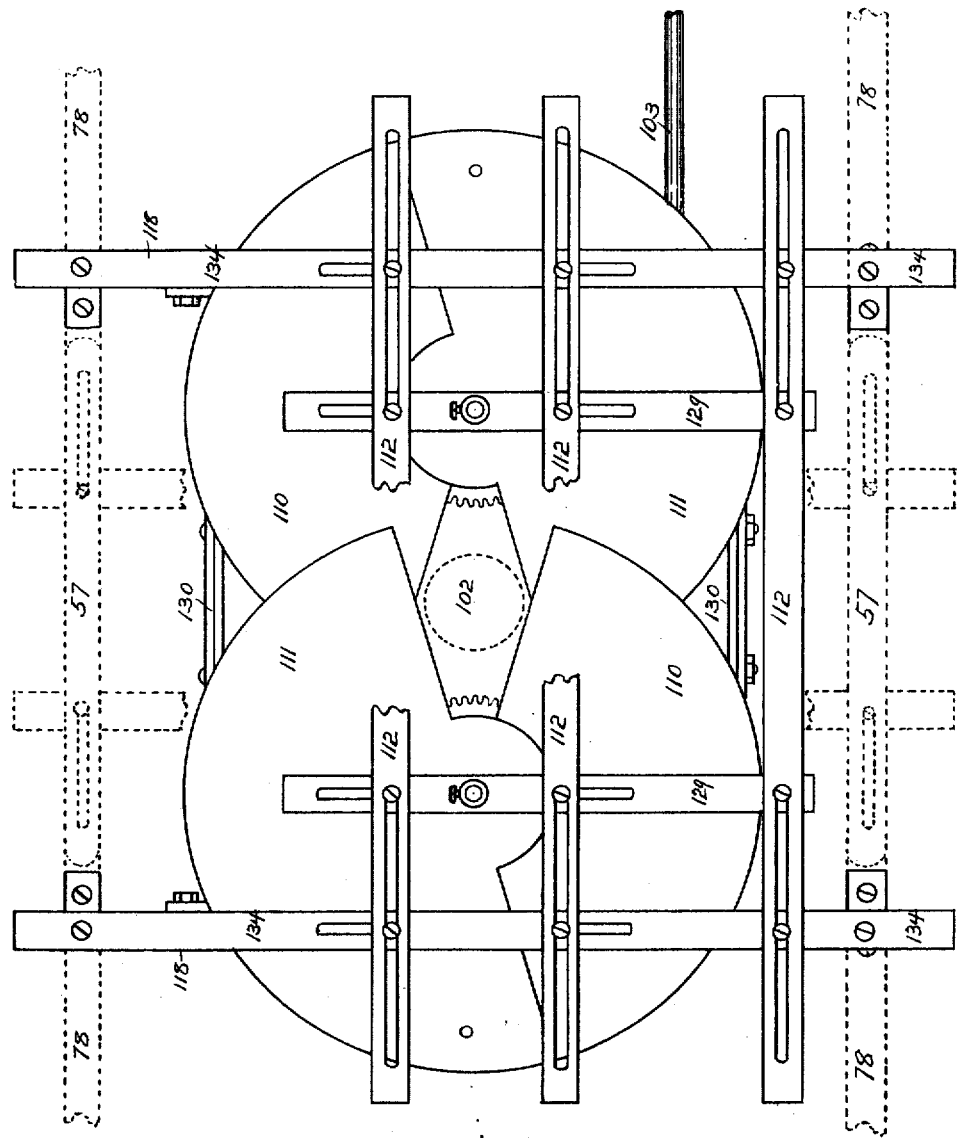

UNITED STATES PATENT OFFICE.

HERMAN FAULKNER, OF SALT LAKE CITY, UTAH.

PHOTOGRAPHIC APPARATUS.

1,013,285.  Specification of Letters Patent.  Patented Jan. 2, 1912.

Application filed April 16, 1909. Serial No. 490,379.

*To all whom it may concern:*

Be it known that I, HERMAN FAULKNER, of Salt Lake City, in the county of Salt Lake and State of Utah, have invented certain new and useful Improvements in Photographic Apparatus; and I do hereby declare the following to be a full, clear, and exact description of the invention, such as will enable others skilled in the art to which it appertains to make and use the same.

This invention relates to photographic apparatus, and more particularly to means for handling and progressively feeding stereoscopic plates, photographic plates, cuts, films or photographic prints.

One object of the invention is to provide a machine of the character described which shall be adaptable for feeding plates progressively in quick succession for making or for projecting so-called moving pictures, or for exhibiting, in more or less rapid succession, photographic prints on cards.

A further object is to provide means whereby photographic prints can be made successively, and so to construct the machine that the rapidity of the feeding of the sensitized printing paper can be regulated and made dependent upon the quantity and strength of the light employed.

A further object is to construct the machine in such manner that it can be adapted for use in feeding various quantities and sizes of plates, films or prints.

A further object is to so construct a machine for feeding plates, films or prints, that it can be operated to convey the plates, films or prints continuously and successively from one magazine to another and back again so that they may thus be caused to travel in a continuous circuit through the magazines and be exposed or subjected to the influence of light during their transit from one magazine to another.

A further object is to provide a machine which may constitute an automatic photographic magazine camera which will operate to make both ordinary and stereoscopic pictures and also perform enlarging and reducing work at any desired speed consistent with the strength of the light and the sensitiveness of the photographic emulsion employed.

A further object is to provide an automatic magazine feeder of slides for stereopticon use, which shall operate to handle such slides so as to expose them in rapid succession, and so that said slides can be made to succeed each other in fractional parts of a second intermittingly or continuously; so that panoramic lantern slides can be fed in succession continuously or intermittingly— or so that "motion-picture" cut-film lantern slides can be fed intermittingly in rapid succession.

A further object is to provide a machine of the character described, by means of which a multitude of mounted photographs or designs of uniform size, can be displayed continuously or intermittingly at one position at any desired speed, to the fractional part of a second.

A further object is to provide a machine which shall be adaptable for use for automatically feeding mounted photographs, post-cards and the like to a reflectoscope, where the pictures or designs are enlarged, illuminated, and thrown on a screen.

A further object is to provide an automatic magazine feeder for all sorts of uniform sized material which needs to be accurately and quickly carried to fixed positions to receive the mark of other machines adjusted to do work on said material in such fixed positions.

A further object is to so construct a machine of the character specified that it can be adjusted from front to rear to vary the capacity of the magazines; so that it can be adjusted lengthwise to adapt it for use with plates of different lengths; so that it can be adjusted from top to bottom to adapt it for plates of different heights; and so that it can be adjusted for the accommodation of plates of different thicknesses.

With these and other objects in view, the invention consists in certain novel features of construction and combinations of parts as hereinafter set forth and pointed out in the claims.

In the accompanying drawings:—Figures 1 and 2 are views which, when read together, constitute a plan of a machine embodying my invention, the parts 62, 69 and 72 being broken away to afford a better view of underlying parts,—said views 1 and 2 also showing portions of the shutter frame and gearing, in dotted lines; Figs. 3 and 4 constitute a rear elevation of the machine,—the front elevation differing therefrom only in that the driving eccentric, and parts operated thereby would appear in the reverse positions to those shown in Figs. 3 and 4. Fig. 5 is an elevation, showing only such parts as appear to the left of the line, A—A of Fig. 1; Fig. 6 is a vertical section on the line A—A of Fig. 1, and also showing a portion of the shutter frame and gearing in dotted lines; Figs. 7 and 8 constitute an inner vertical section with some of the parts omitted; Fig. 9 is a horizontal cross section on the line C—C of Fig. 4. Fig. 10 a vertical cross section of the adjustable raceway through the U-clips 3, just outside the inner wall extension brace beam 66 shown in Fig. 9; Fig. 11 is a fragmentary view showing the position of the left rail support 27 and the adjustable lift rails 25 with respect to the shuttle guide rails 16; Figs. 12 and 13 are the front end elevations respectively of the feeding arrangements which control the intermittent action of the drums 75; Fig. 14 is an enlarged plan view of the ratchet wheel 6 shown in Fig. 12 together with the parts coöperating therewith; Figs. 15 and 16 are rear and end elevations respectively, of the devices which support the plates when in the raceway; Figs. 17, 18 and 19 are views of the plate adapter to be used when a number of plates, less than sufficient to fill the magazines, is employed; Figs. 20, 21, 22 and 23 are plan, end, rear and front views respectively of one of the adjustable shuttles which carry the work forwardly in the raceway; Figs. 24, 25 and 26 are plan, end, and front views respectively of the vertical feeding devices which pass the work from the raceways to the receiving ends of the magazines; Figs. 27 and 28 are plan and side views respectively, of the magazine extension roof; Fig. 29 is an inner elevation at the delivery end of the inner side wall of one of the magazines; Fig. 30 is an outer elevation, and Fig. 31 a plan view of an inside side wall of one of the magazines; Fig. 32 is a bottom plan view and Fig. 33 is a side elevation of one-half of an extension magazine floor; Fig. 34 is a plan view showing the rotary twin-disk photographic and projection shutter and the frame thereof; and Figs. 35 and 36 are rear and front elevations, respectively, of the shutter.

The entire mechanism, with the exception of the lenses, and the means for applying power, is inclosed within a suitable light-tight casing, not shown.

The machine comprehends an automatic plate feeding structure comprising a frame carrying two trapezoidal magazines symmetrically placed with respect to each other; means for conveying the plates through the magazines in parallel positions, parallel to the planes of raceways; two parallel raceways at right angles to the outer ends of the magazines and serving as guides for the plates in train fashion during their travel from one magazine to the other at both front and rear of said magazines; two windows or openings, one in each raceway, at which positions are performed the various kinds of work on the plates desired; means for conveying the plates from the delivery ends of the magazines through the raceways and accurately centering them at the windows, and means for conveying the plates from the raceways into the receiving ends of the magazines. The machine also comprehends the use of a photographic camera and projection shutter, and a printing frame adapter to be connected with the feeder, and also means for applying power to the various operating devices for operating them in their proper order and time.

In constructing the framework of the machine, I employ two vertical front and rear frames each comprising a series of four uprights 55 having slotted intermediate portions; posts or uprights 67 and 68 near one end of the frame, and horizontal upper and lower longitudinal beams connecting the uprights. Each of said horizontal beams comprises three members 78—78 and 57, the latter being slotted and adjustably secured to the former. The front and rear frames are connected by extensible cross beams or braces 50, 62 and 66 as best shown in Figs. 1, 2, 6 and 9. The two intermediate uprights 55 of each front and rear frame are so spaced apart that windows or openings $a$ may be formed between them, and between the central and end uprights 55 of the respective frame, two horizontal magazines $b$, $b$ are disposed transversely of the framework, and these magazines communicate at both ends with raceways $c$, $c$, through which plates are to be passed from one magazine to the other and presented, during such passage, at the windows or openings $a$, as will be more fully hereinafter explained.

Each magazine $b$ is made trapezoidal in shape at each end of the inner wall with a small gate or opening. The object of the trapezoidal shape of the magazines is to provide a wider mouth at the receiving than at the delivery end, thus enabling feeding devices hereinafter described to readily move the incoming plates into the magazine well out of the path of the plates in the raceway in advance of the full sweep of the plates in this path. Such arrangement will prevent any rebounding action of the advance plate when striking against the outer magazine wall from reacting on the succeeding plate causing a check to its forward motion into the magazine from the raceway. The symmetrical arrangement of the two magazines arises from the condition that the wide-mouthed receiving ends of the two magazines are located at diametrically opposite corners of the plate circuit.

The two magazines are identical in construction, and hence a detail description of one will suffice for both.

Each magazine comprises a floor 31, a top or ceiling 35, and sides 34 and 70, and each of these members is made extensible to vary the length of the magazine and hence accommodate the latter for the reception of different numbers of plates,—it being understood that when the machine is operated to pass plates in front of the windows $a$ in the two raceways and to make the travel of plates to follow continuous circuit through the magazine and raceways, a sufficient number of plates should be employed to fill both magazines so that when a plate is discharged from one end of a magazine, another plate will enter the other end of the same magazine and thus keep the same filled.

The inner wall 34 (see Figs. 30 and 31) of each magazine comprises two slotted intermeshing members, each provided at its respective ends with cross bars 38 and 131 which connect the bars of each member. One member of the side 34 is therefore, adjustable lengthwise with respect to the other member. The coöperating walls of the slots of the respective members of the side 34 are preferably beveled and lateral displacement of one member relatively to the other is prevented by means of a bar 39 secured at its respective ends to a cross bar 38 and 131 of one member 31 and passing over a cross bar 131 of the other member. A screw $38^a$ passes through the latter and a slot $38^b$ which extends throughout the major portion of the bar 39, and between the head of this screw and the bar 39, a washer $39^a$ is located and adapted to engage said bar to clamp the members of the magazine side 34 in any position to which it may be adjusted. The inner side wall 34 of the magazine is provided, at the delivery end of the latter, with an adjustable gate 36, the parallel arms of which are adapted to be made to project more or less into the raceway and thus afford means for determining the thickness of the work (the plates) which may be permitted to pass out of the magazine into the raceway. The gate 36 is held at any desired adjustment by means of a set screw 37. The other or outer wall 70 of each magazine is made extensible substantially as above described in connection with the inner wall 34, except that the latter is somewhat shorter than the outer wall, thus allowing the work (plates) to readily pass into the magazine at the receiving end and out at the delivery end. Furthermore, the outer wall 70 is hinged at one end to form a door which enables the charging of the plates into the magazine in the first instance, and this outer wall or door 70 is provided at its free end with a suitable latch $70^a$. The side walls 34 and 70 of the magazine are adjustably supported by means of slotted brackets 80, which in turn are secured to the floor and ceiling strips 81 of the raceway by means of clips 3, as clearly shown in Figs. 7 and 10. The strips 81, which extend the full length of each raceway are supported by blocks 65 and the latter in turn, are secured by the uprights 55 of the framework.

The floor 31 of each magazine is made extensible longitudinally and the construction which permits such adjustment, is substantially the same as that of the magazine sides, and as shown in Figs. 32 and 33. The respective ends of each magazine floor 31, are provided with projecting floor plates 40 having grooved under faces to receive supporting rails 77, and the latter are secured to the blocks 65,—the latter being attached to the frame uprights 55 as before explained. By this construction, an interlocking connection is afforded between the magazine floors and their supports. The outer edges of the projecting magazine floor plates 40 terminate in proximity to the raceway floors and are beveled for a purpose which will hereinafter appear.

Each magazine ceiling 35 is made extensible in a manner similar to that of the side walls and floors of the magazines, (see Figs. 27 and 28) and the said ceilings may, if desired, be supported by rails $77^a$ secured to the blocks 65. However, the extensible magazine ceiling 35, shown in position in Figs. 1 and 6 and in detail in Figs. 27 and 28, is shorter than the magazine floor 31 and carries at each end loose depression idler rollers 32 which operate to depress a conveyer belt 71 into frictional contact with the upper edges of plates in the magazine. The laterally projecting portions at each end of the magazine ceiling (to which the brackets for the journals of rollers 32 are secured) have adjustably secured thereto, slotted L-shaped clips 33. The clips 33 at each end of the ceiling 35 can be adjusted horizontally (by loosening the set screws) and the vertical members of these clips, projecting downwardly, make frictional contact with arms 86 (Fig. 6) secured to bars 38 of the magazine side walls. The depending members of the clips 33 are also connected with the arms 86 by means of coiled springs $86^a$. Thus, the magazine ceiling is supported so as to be capable of slight vertical play, the springs $86^a$ permitting such movement to cause an equalization of the belt 71 on all the plates in the magazine, although some of said plates may vary slightly in their vertical dimensions.

As shown in Fig. 6, the conveyer belt 71, passes under the magazine ceiling 35, and a similar belt 71ª passes over the magazine floor 31. These belts will be so driven (by means hereinafter explained) that their horizontal portions will travel in the same direction and operate, by engagement with the plates in the magazine, to move the same forwardly through the latter toward the respective raceways.

The upper conveyer belt passes over rollers 73 and 76 having their journals mounted in blocks 65 over the respective ends of the magazine. This belt also passes over idle rollers 74—74 disposed between the rollers 73—76 and having their journals mounted in brackets 74ª adjustably secured to and depending from the slotted transverse beams 66. It is apparent that by adjusting the brackets 74ª on the beams 66, the belt 71 may be tightened or loosened as may be necessary to effect the effectual feeding of the plates. In a similar manner, the lower feed or conveyer belt 71ª which passes over the magazine floor 31, also passes over rollers 73ª and 76ª having their journals mounted in the lower blocks 65 below the ends of the magazine. This lower belt 71ª also passes over idle rollers 74ᵇ—74ᵇ having their journals mounted in brackets 74ᶜ adjustably secured to the lower slotted rails 66. It is apparent that the lower feed or conveyer belt may be tightened or loosened by adjusting one or both of the brackets 74ᶜ. It will be observed that the lower belt 71ª passes over the beveled outer edges of the floor extension plates 40. These beveled portions of the plates 40 afford smooth surfaces for the passage of the belt as it passes from over the magazine floor to the rollers below the latter. The beveled ends of the floor plates 40 are in proximity to the raceway floor strips 81, the adjacent edges of which latter are beveled as shown in Fig. 6. Thus elongated slots 81ª are formed through which the lower belt passes out of or into the magazine. If desired the belt roller of each set to which power is applied may be sanded to prevent slipping.

As hereinbefore explained, the plates are fed in vertical position, from a magazine to one of the raceways, and that the strips 81 constitute the ceiling and floors of said raceways. The outer wall of each raceway is formed by blades 64 which are adjustably attached to the uprights of the frame work, and these raceway blades, extending past the mouths of the magazines, constitute end walls for the latter. The plates are fed from the magazines to the raceways and made to bear against the outer wall, or blades 64 of the raceway, said plates being then moved forwardly through the raceway successively by means of devices yet to be described. The inner wall of each raceway comprises three members 89—89—96 (Fig. 8) extending only between the inner magazine walls. The two parts 89—89 are slotted and can be drawn apart to increase the effective length of the inner blade or member 96 were the inner magazine walls to be drawn apart. No screws are passed into or through the raceway floors or ceilings 81 as they are held in position by the blocks 65 (Fig. 6) and the clips 3 (Figs. 7, 8 and 10) as before explained. Clips 3 also serve to secure the inner raceway blades 96 to the floors and ceilings 81 in such manner as to allow the inner blades 96 and 89 to be adjusted with respect to the front or outer blades 64 so as to afford a shallower or deeper raceway and thus enable the machine to be used at different times in carrying various thickness of work.

It has been hereinbefore explained that the plates are fed from a magazine to a raceway, and the mechanism will now be described by means of which the plates are moved successively through a raceway, exposed at a window a therein, and then moved to the receiving end of the other magazine, to be discharged therein, conveyed therethrough and then passed through the other raceway, exposed at the window a therein and finally returned to the receiving end of the first magazine.

For moving the plates forwardly in the raceways as said plates enter the latter from a magazine, I employ reciprocating shuttles 90—91 adapted to engage, alternately, the rear edges of the plates only long enough for each rear edge to move slightly beyond the inner face of the inner wall of the magazine,—the plate being impelled the remaining distance through the raceway to the receiving end of the other magazine by the advancing edge of the next succeeding plate, and the latter is impelled by the other shuttle. The machine would be operative to feed plates through the raceway, with the use of one instead of two shuttles, but the speed of the feed and the speed of successive exposures of the plates at the window a would be reduced. The mechanism at both front and rear of the machine is the same, thus rendering a detail description of both unnecessary, and as the plates are discharged from one end and received by the other end of each magazine, the connections for operating the devices which cause the passage of the plates through the raceways will be such that the action of the shuttles 90 and 91 will be exactly the same at the delivery end of both magazines and at the same time, corresponding shuttles 90 at diagonally opposite corners of the plate circuit (see Figs. 1 and 2) each carrying a plate into its raceway. When the machine is in operation, an odd number of plates (three when adjusted as shown in the drawings) will be in each of the raceways. The sweep of the shuttles 90 and 91 (Fig. 3) are the same, and are just right, with the aid of the alinement of the plates of uniform length to properly center at the operating window $a$, the middle plate of the series in the raceway.

Strips or guides 16 having beveled edges (Fig. 21) are provided for the accommodation of the shuttles 90—91 and these strips or guides are attached to standards 55 of the framework in a manner to permit their vertical adjustment. Each shuttle 90—91 comprises two members adjustably connected together and provided with bearing blocks 26 having grooves in their inner faces for the accommodation of the guides 16. By adjusting the members of the shuttle relatively to each other and correspondingly adjusting the guides 16, the shuttle may be adapted for use with plates of different heights. Arms or links 52 are pivotally attached to the bearing blocks 26 of the shuttle and to these arms or links a shuttle plate 19 is adjustably attached as shown in Figs. 20 to 23. The shuttle plate 19 is provided with arms 24$^a$ having holes for the free passage of headed pins 24$^b$, said pins being adjustably secured to arms 24$^c$ projecting from one of the shuttle members and having springs 24$^d$ thereon, interposed between said arms 24$^a$ and 24$^c$, and the whole constituting governors 24. By the action of these governors, pawls 17 (or a pawl plate 18 if the same be employed in conjunction with or in lieu of the pawls 17) adjustably attached to the shuttle plate, will be quickly thrown back into the delivery portion of a magazine (if previously thrown out from any cause) at the proper time to engage the rear edge of a plate. The pawl governors 24 can be adjusted to allow the pawls 17 or pawl plate 18 to extend into a magazine just the correct distance to carry out at one time, the amount of work desired, whether one or more plates. The shuttle plate is slotted to permit of adjustment of the shuttle for plates of different heights as before mentioned. The pawls 17 can likewise be adjusted until they will engage the rear edges of the plate at or near the upper and lower edges of the plate. In moving delicate plates by means of the shuttles, it is desirable that neither the pawls 17 nor the pawl plate 18 shall be in contact, on the return stroke of the shuttle, with the succeeding plate, after delivering a plate into the raceway. To accomplish this, I provide parallel lift rails 25 (see Figs. 11 and 20 to 22) adjustable longitudinally with relation to each other and supported between the shuttle guides 16, by means of rails 27 secured to standards 55 of the framework, and said lift rails are provided (each at one end) with a cam face 25$^a$ (see Fig. 20). The transverse movable plate 19 of the shuttle, which carries the plate-engaging pawls, is provided with an arm 20, to the free end of which a bracket 21 (carrying a roller 21$^a$) is pivotally supported in such manner that when the shuttle moves forwardly to propel a plate in the raceway, said bracket will turn on its fulcrum and permit the roller 21$^a$ to ride up one of the cams 25$^a$ of one of the lift rails without moving the arm 20 or the shuttle plate 19. When the shuttle starts the return movement toward the delivery end of the magazine, the roller 21$^a$ will ride on the cam end of the other lift rail without turning the bracket 21 in which said roller is mounted (the bracket being so pivoted as to be locked against turning when the shuttle is making its return throw) and hence the arm 20 will be moved so as to shift the shuttle plate 19 (the latter being pivotally supported by means of the links 52) and move the plate-engaging pawls out of line with the plates in the raceway, and thus said pawls will be prevented from engaging the incoming plate in the raceway when the shuttle is making its return stroke. The bracket 21 is normally retained in position by means of a flat spring 22.

Near one end of the framework a shaft comprising members or sections 60—61 is mounted in adjustable brackets 54 and provided with a gear wheel 42 which receives motion from a gear wheel 41, the latter being driven by means of a hand-crank or any suitable motor not shown. Power for operating the various moving elements of the machine is derived from the shaft 60—61. The members composing this shaft are telescopic to permit the shaft to be lengthened when the frame is distended and the magazines lengthened as previously explained.

Eccentrics 51$^a$ are secured to the shaft 60—61 near respective ends thereof and are disposed reversely to each other so that they will be made to operate the shuttles at the front of the machine in the reverse order to the operation of the shuttles at the rear of the machine, by means of the various connections presently to be explained. With the exception of this reverse order of operation, the operating mechanism for the devices for moving plates from one magazine and depositing them into the other, is the same at the front and hence a detail description of one will suffice for both. In Figs. 3 and 4 of the drawings, the rear side of the machine is represented. An eccentric cross head 51 is provided for eccentric 51$^a$ and has a slotted arm 53 for the reception of an adjustable fulcrum which pivotally connects said arm with the slotted lower portion of a walking beam 79,—the latter being pivotally supported between its ends by a suitable pin adjustably supported in the intermediate slotted portion of a standard 67 secured to the framework. The walking beam is slotted near both ends and receives pivot pins 56 which are adjustable in said slotted end portions of the walking beam and also in slotted portions of longitudinally movable bars 69,—said adjustable pins 56 serving to pivotally connect the walking beam with the bars 69. The other end of the bars 69 is pivotally attached at 82—83 to longitudinally movable bars 72. Oscillatory arms 84 are pivotally connected with the upper and lower frame rails 78 by means of fulcrums adjustable in slots in said rails, and said oscillatory arms (which are made in extensible sections) are pivotally connected between their ends to the slotted ends of the bars 72, as shown in Figs. 3 and 4. The extensible, oscillatory arms 84 are connected, respectively, with the shuttles 90 and 91 through the medium of pivoted links 85.

With the above described arrangement of operating mechanism, it will be seen that the necessary reciprocating motion will be imparted to the shuttles to cause them to alternately engage plates as they enter the raceway from the magazine and move them forwardly in the raceway.

In order that the plates shall be fed through the magazines and from the same, in proper time to be engaged by the shuttles to move them forwardly in the raceway, the mechanism now to be described will be employed.

As previously explained, the plates are fed through the magazines by means of the endless conveyer belts 71, 71ª, one passing under the ceiling of the magazine and the other over the floor of the same,—the arrangement of belts for the two magazines being the same, but the direction of travel of the belts of one magazine being reverse to that of the other. The roller 76 of the series over each magazine constitutes the power roller for the upper belt and the roller 76ª of the lower series constitutes the power roller for the lower belt. To respective ends of each of these power rollers 76—76ª, spur wheels 4 and 7 are secured, the wheel 7 being approximately twice the size of the wheel 4. Adjacent to the rollers 76—76ª shafts 63 are located and have their journals mounted in brackets 58 which are adjustably secured to standards 55 of the framework. To each shaft 63, two spur gears 4ª and 7ª are keyed so that one or the other can be moved into mesh with the corresponding spur gear 4 or 7 on the power drums 76, 76ª according to the speed at which it may be desired, the feed belts shall travel. In this way the speed of the feeding of the plates through the magazines and from the latter to the raceways, can be adjusted. To each shaft 63, a bevel pinion 7ᵇ is secured and these pinions mesh and receive motion from bevel pinions 11 secured to a vertical shaft 11ª, the latter being journaled in blocks 9 secured to the framework. Ratchet wheels 6 are secured to the vertical shafts 11ª near respective ends thereof and are engaged by spring-pressed pawls 5 pivotally supported by swinging arms 10, the latter being loosely mounted on the shaft 11ª. Pitmen 132 are pivoted to the arms 10 at one end, and near their other ends, said pitmen are pivotally and adjustably connected with levers 12—14. These levers are pivotally supported by brackets 14ª, which, in turn, are supported by bars 49 secured to standards 55 of the framework,—said brackets being so connected with the bars 49 as to permit of their vertical and also their horizontal adjustment for the purpose of adjusting the pivotal support and consequently the effective sweep of the levers 12—14. The levers 12—14 are provided at their free ends with small rollers 12ᵇ disposed in the paths of the oscillatory arms 84 which control the reciprocation of the shuttles 90—91. From this construction, it is apparent that when an arm 84 swings forwardly to move a plate in the raceway from the discharge end of a magazine, said arm, as it completes its forward throw, will engage the lever 12 (or 14) and swing the same so as to cause the rotation of the shaft 11ª (through the medium of the pitman 132, arm 10, pawl 5 and ratchet wheel 6) and the latter to transmit motion to the rollers of the two endless feed belts, through the medium of the gearing between the shaft 11ª and the power rollers of the feed belts, as above described, and thus the feed belts will be moved forwardly a sufficient distance to move the plates forwardly and discharge the end plate into a raceway. When the oscillatory arm 84 swings back toward the delivery end of a magazine, (thus leaving the lever 12 or 14) the latter, as well as the pitman 132, arm 10 and pawl 5, will be restored to their normal positions by the action of springs 10ª, as shown in Fig. 14.

The sweep of the rotary movement of the shaft 11ª for any definite sweep of the connecting rods or pitmen 132, may be regulated by means of adjustable stops or shields 8 which partially embrace the ratchet wheels 6 and control the coöperation of the pawls 5 with said ratchet wheels in the rotating of the shaft 11ª.

Mechanism has been thus far described which will move the plates through a magazine; feed them to the raceways, and move them forwardly in the raceways past the windows a and to the receiving end of the other magazine. Devices now to be described will be employed for feeding plates in vertical position from the raceways into the receiving ends of the magazines.

Two feeder bars 30 are located at the raceway blades 64 directly in front of the receiving end of each magazine as shown in Fig. 4. The upper one of these feeder bars is shown enlarged in Figs. 24, 25 and 26 and the lower one, is seen projecting into the magazine in Fig. 9. These feeder bars are adapted to engage the upper and lower edges of an incoming plate after it has passed the inner wall of the magazine and before it reaches the outer wall. There will be no obstacle to the movement of the plate farther into the magazine and out of the path of the succeeding plate. The plate having been fed, in a vertical position, into the magazine, is held against any rebounding action out into the path of the succeeding plate until the latter has overlapped the former somewhat, when the blades 30, (through the action of a spring 99$^b$) will move out of the path of the incoming plate.

The inner edges of the feeders 30 are kept parallel to each other and to the inner face of the raceway blades 64 and the end of each feeder first reached by the incoming plate is rounded so that, should the incoming plate strike it, the plate would be deflected into the magazine instead of being stopped short of complete entrance thereinto. The feeder bars 30 are thrust into the magazine in a direction parallel to the axis of the magazine, having a slight component motion to the right in the direction of travel of the incoming plate. This operation is produced by means of the quick action, in a direction opposite to that of the incoming plate, of a thrusting feed arm 94. Such motion is conducted simultaneously to the upper and lower feeders 30 through the medium of a vertical rod 88 connected with the arm 94 and links 92 connected with the respective ends of said vertical rod, said links being pivotally supported between their ends to brackets 95 secured to the raceway blades, and the forward ends of said links are pivotally attached to the feeders 30. The thrusting feed arm 94 is slotted as shown in Fig. 9 and connected with an arm 99$^a$ on a vertical oscillatory rod 99. The rod 99 is oscillated in one direction by a pitman 132$^a$ and in the other direction by the action of a spring 99$^b$ as shown in Fig. 4. The pitmen are connected with pivoted tappet levers 98 which are constructed and mounted in the same manner as are the levers 12—14, Fig. 3. The levers 98 are actuated by oscillatory arms 97 which are the same in construction and mounting as the shuttle operating arms 84 and connected with and operated by the same longitudinally movable bars 72 which operate the shuttle arms 84. Thus the oscillatory arms 97 operate to actuate the feeders 30 to move a plate into the receiving end of a magazine, in the same manner that the oscillatory arms 84 serve to supply power for operating the conveyer belts of the magazines for moving plates through and feeding them from the latter to the raceway in position to be engaged by the shuttles 90—91.

I may also employ a roller feeder 23 at the receiving end of each magazine in lieu of the feeders 30 when only one shuttle (90—91) is employed and the machine is run for a comparatively slow intermittent feed of plates. When this roller feed 23 is in use, it will be connected with one of the oscillatory arms 97 by means of links similar to the links 85 which connect the arms 84 with the shuttles 90—91. The feeder is similar in construction to the shuttles 90—91, except that instead of the shuttle plates and pawls of the latter, the feeders 23 are provided with adjustable rollers 29 which act on the upper and lower edges of the plate in a manner similar to the manner in which the feeders 30 bear thereon.

As one of the shuttles (say the shuttle 90) at its forward sweep is moving a plate toward the receiving end of a magazine, the rollers 29 of the feeder 23 are also moving forwardly in advance of the moving plate and serve the purpose, at this time of holding the contents of the magazine far enough into the magazine to keep a clear path into the magazine for the advancing plate when the shuttle returns for another plate, the rollers 29 of the feeder 23, pass over the last plate to enter the magazine and glide it farther into the magazine, out of the path of the next succeeding plate.

With the construction and arrangement of mechanism hereinbefore described, the feeding of the plates through the raceway, will be continuous, but for taking or projecting pictures, as in moving picture work, the feed should be intermittent. For accomplishing this, the devices now to be explained may be employed.

The power shaft 60—61 is provided with a disk 43 provided at diametrically opposite points with oppositely projecting lugs 44. Adjacent to this disk, a shaft 46 (Figs. 1 and 3) is mounted in brackets 47 secured to an adjustable bar 62 extending from front to rear of the framework and assisting in bracing the same. To this shaft, pallets or pawls 45—45 are secured so as to project at respective sides of the disk 43 so as to be in the path of the lugs 44 on said disk. When the shaft 46 is oscillated, the coöperation of the pawls 45 with the lugs 44 on the diks 43 will cause the intermittent rotation of the shaft 60—61 and hence, the operation of the shuttle 90—91 (which receives motion from this shaft) will also be intermittent. The operation of the pawls 45 is caused by the oscillation of the shaft 46, and to thus operate the latter, it is provided with an arm 48, with which any suitable controlling means is connected, through the medium of a rod 46$^a$. The controlling means above referred to may be a manually operated device, a clock or an electric timing device not shown. Where continuous and not intermittent feed is desired, it is simply necessary to move the pawls 45—45 on the shaft 46 so that they will be out of the path of the lugs 44 on the disk 43.

It may sometimes be desired to operate the machine with a less number of plates than will be sufficient to completely fill the magazines and raceways. In such case only one raceway would be employed and adjustable frames 13 (Figs. 17—18 and 19) will be placed within the magazine and provided with pins 15 to engage the upper and lower feed belts of the magazine. These frames will bear against the end plates in the respective magazines and serve to retain all the plates in the magazines in vertical positions.

The shutter of this machine is a rotary twin disk shutter (see Figs. 6, 34, 35 and 36) and is mounted directly in front of the front window, and the optical axis of whose lenses points to the center of the window $a$. The frame of the shutter consists of two parallel upright posts 107; two shutter frame ribs 133; three front parallel horizontal cross beams 112; two parallel horizontal cross beams, 130; Figs. 34 and 35; (the two upper ones being shown broken in Fig. 36 and giving support to the lens); two parallel focusing draw bars 113, Figs. 34, 35 and 36. The two last mentioned bars connect to the parallel frame beams 78, shown by dotted lines in Fig. 34. Frame beams 78 of the feeding mechanism, Figs. 3 and 4, thus become a portion of the frame of the shutter mechanism. The action of this shutter is that it opens and closes during the interval when a plate is stationary in the raceway window.

The rotary twin disk shutter mounted behind the lens as shown in Figs. 34, 35 and 36 consists of two equal circular disks bearing each an adjustable window in the form of equal sectors of the two circles. The bisectors of the angles of the sectors are in one straight line when projected onto a vertical plane at the instant when the shutter is full open and light is reaching the entire surface of the raceway window. They are shown in this position in Figs. 35 and 36. The shutters rotate in the same direction at the same speed and result in allowing the same amount of light to reach all parts of the plate in the raceway window at one exposure. The time of exposure can be regulated by the speed of the machine and the percentage of exposure with respect to total exposure and darkness can be varied by varying the size of the sector angles for the two disks. While this angle must be large enough to include at one instant the diameter of the lens, it may be made much larger.

The ability to make the aperture of the twin disk shutter larger also provides that the same shutter may be adjusted to various sizes of lenses. The ability to regulate the size of the shutter aperture results from the construction of each of the circular disks, and from the ability to make the axis of the disk nearer together or farther apart along with the like movement of the upright posts 118. The horizontal shutter beams 130 are each composed of two slotted parts which may be drawn apart, or vice versa, by loosening the slot bolts which bind them together.

Each circular shutter disk is composed of two parts 110 and 111 the outer edge of which are semicircles. At the center of each of these semi-circles is another but smaller semi-circular extension whose object is to provide an articulation of the semi circular disk with the shutter shaft 106, Fig. 34, and its sleeve nut. Each one of the semi circular disks 110, is slotted to carry the set screw 117$^a$, Fig. 36, while the set screw remains in a fixed position in the other semi-circular disks 111. Thus by releasing the set screw 117 the angle of the sector-like apertures can be varied at will within the limitations of the slot.

The rotation of the power shutter shaft 103 (which receives motion through gears 100, 101 from the main power shaft 60—61) is transmitted through the twin bevel gears 104 to the shaft carrying the lower of the two spur gears 109. Each one of the circular disks has its own shaft supported by the parallel upright shutter shaft posts 107, Figs. 35 and 129, Fig. 36. The upright shutter shafts 107 also support the adjustable draw out shafts 105, Fig. 34.

If desired the member of the twin spur gears on shaft 103, near the end of the shaft, Fig. 35, can be slipped off the end of the shaft and be replaced thereon with the bevel facing the opposite direction and engaging its twin on the right instead of the left side of its axis as viewed in Fig. 35. This will cause the two disks to rotate in opposite directions and the speed of the shutter is cut in half.

The arrangement of the shutters when the two circular disks are moved in the same direction results in the straight edges of parts 110 remaining always parallel. The same is true of the two straight edges of 111. The shutter is then opened from the center and closed toward the center.

My improvements permit of the nicest adjustment to do the most accurate and delicate work, although the machine itself is not delicate. It also allows the dimensions of the machine to be enlarged, first, from front to rear, to enlarge the capacity of the magazines; second, from end to end, to enable longer plates to be used; third, from top to bottom, to enable taller plates to be used; fourth, in the depth of the raceway grooves and magazine gateways to permit the use of thicker plates.

The adjustments for accuracy and for raceway depths have previously been fully described herein, except the arrangement for properly centering the plates in the raceway window and to render the plates absolutely stationary when in that position. To each of the upper and lower raceway blades 96, Figs. 7 and 8, are fastened tension springs which press the plate outward firmly against the outer raceway blades 64. Through a slotted opening in the ceiling 81 of the raceway window a tension spring 59 presses down against the upper edge of the plate as it comes into position therein. The pressure of the three springs prevents all vibration of the plate after it has stopped, and this tension can be made of the correct strength to stop the plate at just the right point.

The front and rear may be drawn farther apart,—reference being had to the plan drawings Figs. 1 and 2—by releasing the bolts which bind together the adjustable cross frame beams 50, 62 and 66, the set screws which bind together 60 and 61 of the power shaft and the set screws which bind together the two parts of each of the magazine walls, floors and ceiling through their brace beams 39. Freeing the bolts on the cross frame beams 66 also releases the supports from the drum idlers attached thereto and allows them to be brought nearer together, thus increasing the effective length of the belts to accommodate the increased length of the magazines. The front and rear portions of the machine can then be drawn apart and when the set screws and bolts above referred to as released are again tightened and when the larger magazines are filled with plates, the machine is ready for operation again.

In order to enlarge the machine in a horizontal line so as to accommodate longer plates it is necessary to release the bolts or machine screws which bind first, the inner raceway blade 64 to the uprights 55, Figs. 7 and 8; second, parts 89 to 96 of the inner raceway blades; third, the U-clips 3 to the parts included in them (previously explained); fourth, parts 57 to 78; fifth, parts 72 to 97; sixth, raceway extension blades 89 Fig. 6 to step block hangers 65; and seventh, the vibrating arms 87 to 94, Fig. 9. The above releasing must be done in both the front and the rear. Now, if the two ends of the machine be pulled apart, the central upright posts 55 will be separated and the windows will then display the longer plate. The length of the raceway must be made just three times the length of a single plate to be run. But the magazines must also be widened. This is accomplished by releasing the machine screws which bind together the parts of the ceiling depression L-brackets 33, when the outer walls can be further separated. The floors and their belts can then be centered in the widened magazine. The fulcrums of the shuttle cranks 84 and the roller feeder cranks 97 must be centered above and below the axes of the magazines.

To obtain the longer sweep of the shuttle cranks and feeder cranks to handle the longer plates it is only necessary to slightly lengthen these cranks and to raise the eccentrics and their power shaft with respect to the fulcrums of the walking arms. By raising the bracket shaft hangers 108, Figs. 1, 2, 34 and 35, which carry the shutter shaft 103, the latter would also be raised sufficiently to keep its bevel gear 101 engaged with the bevel gear 100 on the front end of the power shaft.

If the twin disk shutter is attached to the automatic feeding device, before the magazines can be drawn apart it is necessary to release the bolts binding together the two parts of the horizontal shutter supporting cross beams 130 and to release the horizontal shutter frame beam 112 from upright post 134. This removes all obstacles to the drawing apart of the two ends of the machine.

By enlarging the angle of aperture of the rotary twin disks a larger lens may be accommodated to cover the field of the longer plate. The axes of the two disks may be separated if desired, but their separation is independent of the separation of the upright shutter post 134. Now if the parts previously loosened to allow of the extension be firmly fixed again the machine will be ready to handle the longer plates.

The machine can be adjusted to run taller or shorter plates. As fitted together in the appended drawings the machine is carrying as tall plates as is possible for it, but it can be adjusted to carry shorter plates. Loosen both in the front and in the rear the bolts or machine screws which hold the floor and ceiling cross beams 77 to the upright machine posts 55, which bind the inner raceway blades 64 to the uprights 55 and 67 which bind together the two parts of shuttle cranks 84 and roller feeder cranks 87, and which bind shuttle guideways 16 to uprights 55. Now drawing the parts loosened toward the horizontal axis of the machine and tightening the above loosened bolts and machine screws, the machine is ready for operation. It is not necessary to alter the position of any part of the shutter to accomplish this. The construction which allows this has been previously explained.

Various changes might be made in the details of construction of my invention without departing from the spirit thereof or limiting its scope and hence I do not wish to restrict myself to the precise details herein set forth.

Having fully described my invention what I claim as new and desire to secure by Letters-Patent, is:—

1. In a machine of the character described, the combination of two magazines, raceways connecting both ends of said magazines, each of said magazines having greater width at their receiving than at their discharge ends, and means for passing work from the narrower end of one magazine through the raceways to the wider end of the other.

2. In a machine of the character described, the combination of two trapezoidal magazines, and raceways connecting the wider end of each magazine with the smaller end of the other.

3. In a machine of the character described, the combination of two magazines, and a raceway, one of said magazines having a wider receiving opening at one end than the delivery opening of the other magazine, said delivery and receiving ends of the two magazines communicating with the same raceway, and means for passing plates through the raceway from the smaller delivery outlet of one magazine to the larger receiving inlet of the other magazine.

4. In a machine of the character described the combination with a raceway, of a longitudinally adjustable magazine communicating therewith.

5. In a machine of the character described, the combination with two raceways having windows, of two longitudinally adjustable magazines at respective sides of said windows and communicating at each end with said raceways.

6. In a machine of the character described, the combination with raceways having floor and ceiling strips, of magazines communicating with said raceways, and means connected with said floor and ceiling strips for supporting the side walls of the magazines.

7. In a machine of the character described, the combination with raceways having floor and ceiling strips, magazines communicating with said raceways, brackets adjustably secured to the side walls of the magazines, and means for connecting said brackets with the floor and ceiling strips of the raceways.

8. In a machine of the character described, the combination with raceways having floor and ceiling strips, of magazines communicating with said raceways, brackets adjustably secured to the side walls of the magazines, and clips connecting said side walls with the floor and ceiling strips of the raceways.

9. In a machine of the character described, the combination with a magazine having a vertically movable top, of friction devices for supporting said top, a conveyer belt movable under said top, and a conveyer movable in the same direction over the floor of the magazine.

10. In a machine of the character described, the combination with a magazine having a vertically movable top, of friction means supporting said top, springs connecting said friction means, a conveyer belt passing under said magazine top, and a conveyer belt passing over the floor of the magazine.

11. In a machine of the character described, the combination with a magazine having a vertically movable top, of means for supporting said top, rollers carried by the ends of said top, a conveyer belt passing over said rollers and under the magazine top, and a conveyer belt passing in the same direction over the floor of the magazine.

12. In a machine of the character described, the combination with a magazine, of endless belts passing through the same adjacent to the top and bottom thereof, idle rollers over which said endless belts pass, brackets in which said idle rollers are mounted and means for adjustably supporting said brackets.

13. In a machine of the character described, the combination with a framework, and magazines supported thereby, of blocks secured to said framework, rollers mounted in said blocks, intermediate idle rollers, means for adjustably supporting the latter and endless belts passing over said rollers and movable through the magazine near the top and bottom of the latter.

14. In a machine of the character described, the combination with a transversely adjustable framework, of a longitudinally adjustable magazine supported therein.

15. In a machine of the character described, the combination with a transversely adjustable framework having two longitudinally disposed raceways provided with windows, of two longitudinally adjustable magazines supported by said framework at respective sides of said windows and communicating at both ends with said raceways.

16. In a machine of the character described, the combination with a magazine, of an adjustable raceway communicating with said magazine adapted to receive therefrom.

17. In a machine of the character described, the combination with a magazine, of a raceway communicating therewith and adapted to receive plates therefrom, and means for adjusting said raceway to vary the width thereof to accommodate plates of different thicknesses.

18. In a machine of the character described, the combination with a magazine, of a raceway communicating therewith and adapted to receive plates therefrom, and means for adjusting the length of said raceway.

19. In a machine of the character described, the combination with two magazines, of a raceway communicating with both magazines, means for adjusting the inner walls of the respective magazines relatively to each other, and means for adjusting the length of the raceway between the two magazines.

20. In a machine of the character described, the combination with two magazines, of a raceway communicating with said magazines and connecting them, said raceway having adjustable inner blades and walls and outer blades or walls and floor and ceiling strips, and brackets and clips adjustably connecting the inner raceway blades or walls and the raceway floor and ceiling strips with the magazines.

21. In a machine of the character described, the combination with framework, of two magazines supported thereby, a raceway communicating with and connecting said magazines, said raceway comprising floor and ceiling strips, outer blades or walls adjustably secured to the framework and extending past both magazines to form end walls for the latter, and inner walls extending between the inner walls of the two magazines and comprising longitudinally extensible members.

22. In a machine of the character described, the combination with a raceway having a window, and a magazine communicating with said raceway, of a reciprocating shuttle, a pivotally supported shuttle plate, and pawls carried by said plate and adapted to engage plates entering the raceway from the magazine and move the same forwardly in the raceway.

23. In a machine of the character described, the combination with a raceway having a window and a magazine, of a reciprocating shuttle comprising an adjustable member and provided with engaging means for plates entering the raceway from the magazine, and vertically adjustable horizontal guides for said shuttle.

24. In a machine of the character described, the combination with a raceway having a window, and a magazine communicating with said raceway, of a reciprocating shuttle comprising two members adjustable vertically with relation to each other, vertically adjustable horizontal guides for said shuttle, and a pawl carried by said shuttle and adapted to engage plates entering the raceway from the magazine.

25. In a machine of the character described, the combination with a raceway having a window, and a magazine communicating with said raceway, of a reciprocating shuttle, a spring-pressed shuttle plate carried by said shuttle, and plate engaging pawls carried by said shuttle plate.

26. In a machine of the character described, the combination with a raceway and a magazine communicating therewith, of a reciprocating shuttle, a yielding shuttle plate carried by said shuttle, and plate-engaging pawls adjustably secured to respective ends of said shuttle plate.

27. In a machine of the character described, the combination with a raceway and a magazine communicating therewith, of a reciprocating shuttle, arms pivoted thereto, a shuttle plate to which said arms are adjustably connected, and plate engaging pawls adjustably secured to said shuttle plate.

28. In a machine of the character described, the combination with a raceway and a magazine communicating therewith, of a reciprocating shuttle, pivoted arms and fixed arms projecting from said shuttle, a shuttle plate secured to the pivoted arms, plate-engaging means secured to the shuttle plate, arms projecting from said shuttle plate, pins adjustably secured to the fixed arms on the shuttle and passing freely through the arms on the shuttle plate, and springs on said pins between the arms on the shuttle plate and the fixed arms on the shuttle.

29. In a machine of the character described, the combination with a raceway and a magazine communicating therewith, of a reciprocating shuttle for moving plates from said magazine into the raceway, a plate engaging pawl carried by the shuttle, and means for moving said pawl out of the path of the plates in the raceway during the return sweep of the shuttle.

30. In a machine of the character described, the combination with a raceway and a magazine communicating therewith, of a reciprocating shuttle provided with a shuttle plate movably connected therewith and carrying a plate-engaging pawl, and means coöperating with said movable shuttle plate for moving the same to move the pawl out of the path of the plates in the raceway during the return sweep of the shuttle.

31. In a machine of the character described, the combination with a raceway and magazine communicating therewith, of a reciprocating shuttle provided with a shuttle plate movably connected therewith and carrying a plate-engaging pawl, an arm projecting from said shuttle plate, and a cam coöperating with said arm to move the shuttle plate to dispose the pawl carried thereby out of the path of plates in the raceway during the return sweep of the shuttle.

32. In a machine of the character described, the combination with a raceway and a magazine communicating therewith, of a reciprocating shuttle provided with a shuttle plate movably connected therewith and carrying a plate-engaging pawl, an arm projecting from said movable shuttle plate, a bracket pivoted to said arm and movable in one direction only from its normal position, a spring bearing on said bracket, a roller mounted in said bracket, and cams to be engaged by said roller one of said cams operating to move the shuttle plate to dispose the plate-engaging pawl carried thereby, out of the path of the plates in the raceway, during the return sweep of the shuttle.

33. In a machine of the character described, the combination with a raceway and a magazine communicating therewith, of a reciprocating shuttle provided with a movable shuttle plate carrying a plate-engaging pawl, an arm projecting from said shuttle plate, and an adjustable cam to coöperate with said arm for moving the shuttle plate and disposing the plate-engaging pawl carried thereby, out of the path of the plates in the raceway during the return sweep of the shuttle.

34. In a machine of the character described, the combination with a raceway and a magazine communicating therewith, of two shuttles for moving plates in the raceway from the magazine, a power shaft, and means connecting the power shaft with the shuttle for reciprocating the latter alternately in opposite directions.

35. In a machine of the character described, the combination with a raceway and a magazine communicating therewith, of two shuttles for moving plates in the raceway from the magazine, a power shaft, a walking beam, connections between the power shaft and the walking beam for operating the latter, oscillatory arms connected with the shuttle for operating them, and connections between said oscillatory arms and the respective ends of the walking-beams.

36. In a machine of the character described, the combination with a raceway and a magazine communicating therewith, of two shuttles for moving plates in said raceway from the magazine, oscillatory arms, links connecting said arms with the shuttles, reciprocating bars connected with said oscillatory arms, and means for reciprocating said bars.

37. In a machine of the character described, the combination with a raceway and a magazine communicating therewith, of two shuttles for moving plates in said raceway from the magazine, extensible oscillatory arms, links connecting said arms with the shuttles, reciprocating bars pivotally and adjustably connected with said arms, and means for reciprocating said reciprocating bars.

38. In a machine of the character described, the combination with a raceway and a magazine communicating therewith, of two shuttles for moving plates in said raceway from the magazine, a power shaft, an eccentric thereon, an eccentric cross-head, a walking-beam pivotally and adjustably connected with said cross-head, longitudinally-movable bars pivotally and adjustably connected with said walking beam, oscillatory arms pivotally and adjustably connected with said longitudinally-movable bars, and links connecting said oscillatory arms with the respective shuttles.

39. In a machine of the character described, the combination with a raceway, a magazine communicating therewith and upper and lower conveyer belts for moving plates through the magazine and feeding the same to the raceway, of means operating to intermittingly drive both of said belts simultaneously in the same direction.

40. In a machine of the character described, the combination with a raceway, a magazine communicating therewith, upper and lower conveyer belts for feeding plates from the magazine to the raceway, and means for moving the plates forwardly in the raceway of means for operating said last-mentioned moving means, mechanism interposed between said last-mentioned plate moving means and the conveyer belts for propelling the latter, whereby the forward movement of a plate in the magazine will cause the feeding of a plate from the magazine to the raceway.

41. In a machine of the character described, the combination with a raceway, a magazine communicating therewith, upper and lower conveyer belts for moving plates through the magazine and feeding them to the raceway, a shuttle for moving plates in the raceway, an oscillatory arm for reciprocating said shuttle, and means for oscillating said arm, of mechanism operative by said oscillatory arm for intermittingly propelling both magazine conveyer belts substantially in the same direction.

42. In a machine of the character described, the combination with a raceway, a shuttle for moving plates therein, an oscillatory arm for moving plates in the raceway and means for oscillating said arm, of a magazine communicating with said raceway, upper and lower conveyer belts for moving plates through said magazine and feeding them to the raceway, gearing for imparting motion to said conveyer belts, ratchet devices for propelling said gearing, a pitman connected with said ratchet devices, and a pivoted lever connected with said pitman and disposed in position to be operated by the oscillatory arm which operates the shuttle.

43. In a machine of the character described, the combination with a raceway and a magazine communicating therewith, of upper and lower conveyer belts for moving plates through and feeding them from the magazine to the raceway, rollers over which said belts pass, a counter shaft adjacent to one roller of each set, gearing between said counter-shafts and rollers, a driving shaft, gearing between the driving shaft and counter-shafts, and means for operating said driving shaft.

44. In a machine of the character described, the combination with a raceway and a magazine communicating therewith, of upper and lower conveyer belts for the magazine, a series of rollers for each belt, a counter-shaft adjacent to one roller of each series, gearing between the counter-shafts and rollers, a driving shaft, gearing between the driving shaft and counter-shafts, and ratchet devices for driving said driving shaft intermittingly.

45. In a machine of the character described, the combination with a raceway and a magazine communicating therewith, of upper and lower conveyer belts for the magazine, a series of rollers for each belt, a driving shaft, gearing between said driving shaft and one roller of each series, ratchet devices for imparting intermittent motion to the driving shaft, and an adjustable stop device for regulating the effective throw of said ratchet devices.

46. In a machine of the character described, the combination with two magazines, and a raceway connecting them, of feeding means for moving plates through the magazines, shuttles for moving plates from the delivery end of one magazine to the receiving end of the other, feeders for moving the plates from the raceway into this receiving end of a magazine, operating means for the shuttles, and devices actuated by said operating means for operating all of said feeding means when the shuttles operate.

47. In a machine of the character described, the combination with a raceway and a magazine communicating therewith, of means for moving plates in the raceway to the receiving end of the magazine, feed bars adapted to engage the upper and lower edges of a plate, and means for actuating said feed bars to move the plate in a vertical position into the receiving end of the magazine.

48. In a machine of the character described, the combination with a raceway and a magazine communicating therewith, of means for moving plates in the raceway to the receiving end of the magazine, feeding bars at the receiving end of the magazine adapted to engage the upper and lower edges of a plate, pivoted links attached to said feed bars, a rod connected with said links for moving the feed bars to move the plate in a vertical position into the magazine, an oscillatory rod having an arm connected with the first mentioned rod, and means operative simultaneously with the plate-moving-means for oscillating said oscillatory rod.

49. In a machine of the character described, the combination with a raceway having a window, of a shuttle for moving plates in said raceway, a power shaft, connections between said power shaft and said shuttle, and means for effecting the intermittent rotation of said power shaft.

50. In a machine of the character described, the combination with a raceway having a window and a shuttle for moving plates in said raceway, of a power shaft, a disk secured to said shaft and provided with lugs, pawls to coöperate with said lugs to cause the intermittent rotation of said shaft, and means for operating said pawls.

51. In a machine of the character described, the combination with a magazine and upper and lower feed belts for moving plates through the magazine and adjustble frames removably located in the magazines and provided with pins to engage said feed belts.

52. In a machine of the character described, the combination with an adjustable framework, of an adjustable raceway having a window, an adjustable magazine at right angles to said raceway and communicating therewith, an adjustable camera frame on the front of the said adjustable framework, a camera supported by said camera frame, means for moving plates in the raceway from the magazine to the raceway window, and means for operating said plate moving means for operating the camera shutter simultaneously.

In testimony whereof, I have signed this specification in the presence of two subscribing witnesses.

HERMAN FAULKNER.

Witnesses:
PRESTON J. CANNON,
VERNOR B. CUTLER.